C. H. WHIPPLE.
ECCENTRIC BORING TOOL HOLDER.
APPLICATION FILED APR. 29, 1912.
1,051,531. Patented Jan. 28, 1913.
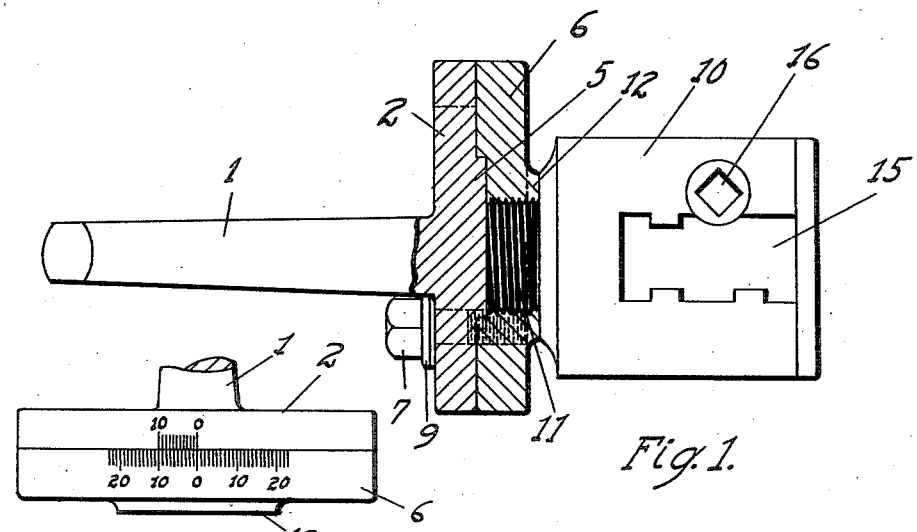
Fig. 1.
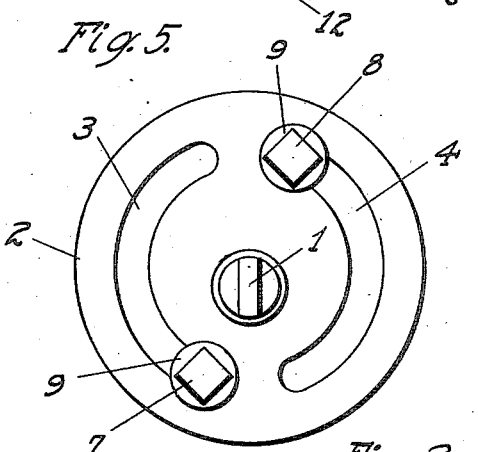
Fig. 5.
Fig. 2.
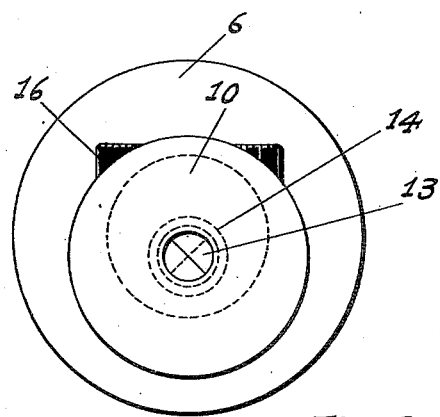
Fig. 3.
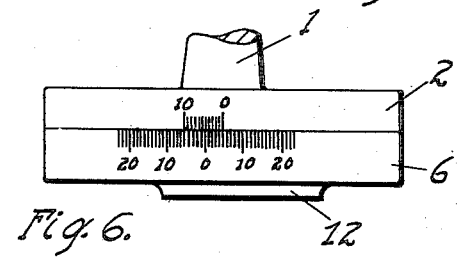
Fig. 6.
Fig. 4.
WITNESSES:
Paul A. R. Kroesing, jr.
Virginia C. Spratt
INVENTOR
Charles H. Whipple
BY
Ratzemond A. Parker
ATTORNEY

UNITED STATES PATENT OFFICE.

CHARLES H. WHIPPLE, OF DETROIT, MICHIGAN.

ECCENTRIC BORING-TOOL HOLDER.

1,051,531.  Specification of Letters Patent.  Patented Jan. 28, 1913.

Application filed April 29, 1912. Serial No. 693,927.

*To all whom it may concern:*

Be it known that I, CHARLES H. WHIPPLE, a citizen of the United States, residing at Detroit, county of Wayne, State of Michigan, have invented a certain new and useful Improvement in Eccentric Boring-Tool Holders, and declare the following to be a full, clear, and exact description of the same, such as will enable others skilled in the art to which it pertains to make and use the same, reference being had to the accompanying drawings, which form a part of this specification.

This invention relates to eccentric boring tool holders and has for its object an arrangement of the chuck with respect to the shank through which the power is transmitted, so that the tool may be given any desired eccentricity, within given limits, to the axis of revolution of the shank.

A further object is an arrangement whereby the shank-head and the chuck-head come together in registry, the peripheries of each accurately registering and maintaining such registry regardless of adjustments secured by different eccentricities of the holding portion of the chuck.

A further object of this invention is the use of a vernier to measure small fractions of the eccentricity of the chuck with respect to the shank. The arrangement of the chuck-head and the shank-head in perfect registry at all points of adjustment makes the use of this vernier possible.

In the drawings:—Figure 1, is a side elevation of the assembled chuck and shank, showing the chuck-head and shank-head sectioned. Fig. 2, is an end view of the assembled tool-holder viewed from the shank end. Fig. 3, is an end view of the tool-holder viewed from the chuck end. In this figure the axis of the chuck registers with the axis of the shank. Fig. 4, is the same view as shown in Fig. 3, but with the chuck adjusted so that its axis is eccentric to the axis of the shank. Figs. 5, is a detail of the shank-head and chuck-head, showing the means by which the eccentricity may be measured. Fig. 6, is a detail like Fig. 5, but showing the vernier portion, that is, the chuck-head, turned with respect to the shank-head scale, so that the chuck is eccentric to the shank.

1, is the shank which fits into the revolving head of the machine and through which the power is transmitted to the tool-holder. The shank 1 enlarges at its outward end to form the portion 2 which, for the purpose of clearness, will be called the shank-head. The shank-head has two segmental slots 3 and 4, respectively. These slots are of equal length and are concentric to the center of the shank-head. At the center of the shank-head and having its periphery concentric to the center of the shank-head is the boss or pivot 5. On the outward end of the shank-head 2, the chuck-head 6 fits. This chuck-head has a socket that fits accurately over the boss or pivot 5 and this socket is exactly centric of the chuck-head 6, while the periphery of the chuck-head 6 accurately registers with the periphery of the shank-head 2. The two screws 7 and 8 screw into the chuck-head 6 and engage through the slots 3 and 4, respectively of the shank-head 2 and are provided with washers 9 which bind upon the surface of the shank-head when the screws are tightened. It will readily be seen that when the screws are loosened, the chuck-head may be turned with respect to the shank-head within the limits allowed by the length of the slots.

The chuck 10 screws into the chuck-head 6 through a threaded aperture 11, which is concentric with the circular raised portion 12 of the chuck-head. In Fig. 1, it will be seen that the circular raised portion 12 is located on the chuck-head off-center. It will also be seen that the shank 1 joins the shank-head 2 at a point off-center of the shank-head. However, the axis of the chuck is in line with the axis of the shank in this figure, and hence the tool-holder holds the tool on the axis of revolution and in this adjustment, the tool cannot be said to be eccentric. Fig. 3, shows an end view of the same and in this figure the circular mouth 13 of the tool will be seen to be concentric with the dotted lines 14 which indicate the junction of the shank 1 with the shank-head. Fig. 5, shows the position of the measuring devices when the chuck and the shank have their axes in line. It will be seen that the graduated scale on the shank-head and the graduated scale on the chuck-head, the latter of which is the vernier, have zero marks registering. However, when the screws 7 and 8 are loosened and the chuck-head 6 turns with respect to the shank-head, the chuck and the shank both being off-center of their respective heads must needs have their axes turn out of alinement and, inasmuch as the shank 1 has its axis always on the axis of revolution, the chuck may be said to be eccentric, when its axis is thrown out of alinement with the axis of the shank 1. Such condition is shown in Fig. 4, where it will be seen that the circular mouth of the chuck is eccentric to the dotted line 14 which represents the shank. The same condition is shown in Fig. 6, which plainly indicates the circular raised portion 12 to be off-center with respect to the shank 1. The construction of the chuck is no part of this invention. However, in the drawings the jaw 15 is seen and this is moved in and out by the screw 16.

The measuring devices, by which the eccentricity of the axis of the chuck with respect to the axis of revolution, is measured, comprises a graduated scale on the shank-head 2 and a graduated scale on the chuck-head 6, the former of which is known as a vernier. The scale that I have shown on the shank-head comprises but one division, although several might be used. This division is divided off into eleven sub-divisions. The scale shown on the chuck-head is divided off into two or more divisions on each side of zero and these divisions are of length equal to the length of the one scale shown on the shank-head, but each division is divided off into ten sub-divisions. Each division represents one-tenth of an inch of eccentricity, each sub-division on the chuck-head represents one-hundredth of an inch of eccentricity. It will readily be understood by those familiar with the vernier that with the ratio of ten to eleven in the divisions of the chuck-head and the shank-head, respectively, that when the chuck-head is turned so that sub-division 1 registers with sub-division 1 of the shank-head that the two members have been moved into eccentric relation by one-tenth of one sub-division of the chuck-head which would be one-thousandth of an inch. Similarly when the sub-division lines 2 of the two scales register, the eccentricity is two one-thousandths and so on through the sub-division lines.

What I claim is:—

1. An eccentric boring tool holder, having in combination, a shank-head, a shank attached thereto eccentrically, a chuck-head rotatably connected for adjustment to the shank-head so as to revolve on a center registering with the center of the shank-head, and a chuck attached to the chuck-head eccentrically, substantially as described.

2. An eccentric boring tool holder, having in combination, a shank-head, a shank attached thereto eccentrically, a chuck-head rotatably connected to the shank for adjustment and having its center registering with the center of the shank-head and a chuck attached to the chuck-head eccentrically and at a location so that at one point in its revolution, the axis of the chuck will register with the axis of the shank, substantially as described.

3. An eccentric boring tool holder, having in combination, a circular shank-head, a shank attached thereto eccentrically, a circular boss on the shank-head having its periphery concentric to the center of the shank-head, a circular chuck-head having its periphery registering with the periphery of the shank-head and provided with a socket adapted to fit over the boss of the shank-head and located on the center of the chuck-head, means for holding the chuck-head and shank-head together, and adapted to allow the head to be adjusted rotatively and a chuck attached to the chuck-head eccentrically thereof, substantially as described.

4. An eccentric boring tool holder, having in combination, a circular shank-head, a shank attached thereto eccentrically, a circular chuck-head rotatably connected for adjustment to the shank-head so that the peripheries of the two register and so that the chuck-head revolves on a center registering with the center of the shank-head, and a chuck eccentrically attached to the chuck-head, substantially as described.

5. An eccentric boring tool holder, having in combination, a circular shank-head, a shank attached eccentrically thereto, a circular chuck-head rotatably connected for adjustment to the shank-head so that the peripheries of the two heads register and so that the chuck-head revolves on a center registering with the center of the shank-head, and a chuck attached to the chuck-head eccentrically and located on the chuck-head so that the axis of the chuck will at one point in the revolution of the chuck-head register with the axis of the shank, substantially as described.

6. An eccentric boring tool holder, having in combination, a circular shank-head, a shank attached thereto eccentrically, a circular chuck-head rotatably connected for adjustment to the shank-head so that the peripheries of the two heads register and so as to be rotatable on a center registering with the center of the shank-head, a chuck attached to the chuck-head eccentrically thereto, a scale on one of the heads and a vernier scale on the other head, substantially as described.

7. An eccentric boring tool holder, having in combination, a shank-head, a shank eccentrically attached thereto, the said shank-head being provided with a segmental slot, a screw passed through the segmental slot, a chuck-head rotatably held by the screw to the shank-head so that the centers of the two heads register and are rotatable for purposes of adjustment and a chuck eccentrically attached to the chuck-head, substantially as described.

In testimony whereof, I sign this specification in the presence of two witnesses.

CHARLES H. WHIPPLE.

Witnesses:
STUART C. BARNES,
VIRGINIA C. SPRATT.